R. DELAUNAY-BELLEVILLE.
WATER JACKETED GEAR CASING FOR TORPEDOES.
APPLICATION FILED JULY 20, 1914.
1,130,491.
Patented Mar. 2, 1915.
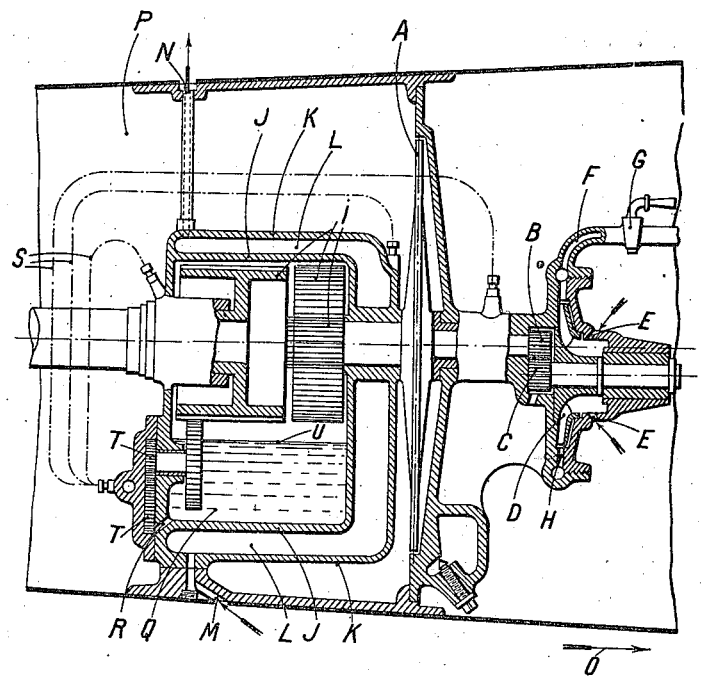

UNITED STATES PATENT OFFICE.

ROBERT DELAUNAY-BELLEVILLE, OF ST.-DENIS, FRANCE, ASSIGNOR TO SOCIETE ANONYME DES ETABLISSEMENTS DELAUNAY-BELLEVILLE, OF ST.-DENIS, FRANCE, A CORPORATION OF FRANCE.

WATER-JACKETED GEAR-CASING FOR TORPEDOES.

1,130,491.   Specification of Letters Patent.   Patented Mar. 2, 1915.

Application filed July 20, 1914. Serial No. 852,076.

*To all whom it may concern:*

Be it known that I, ROBERT DELAUNAY-BELLEVILLE, a citizen of the French Republic, residing at St.-Denis, Department of the Seine, in France, have invented certain new and useful Improvements in Water-Jacketed Gear-Casings for Torpedoes; and I do hereby declare the following to be a full, clear, and exact description of the invention, such as will enable others skilled in the art to which it appertains to make and use the same.

The present invention relates to self propelled torpedoes actuated by turbines; the angular speed thereof being very great, it is necessary to interpose speed reduction gearing in order that the propellers may rotate at a suitable speed.

The invention has for its object a peculiar casing for the speed reduction gearing, constituting also the oil reservoir, and means for protecting it against the detrimental action of the gases at a high temperature which traverse the rear compartments of the hull, by the circulation of water. A rotary pump provided with gearing is also used for conveying the oil under pressure to the bearings.

The accompanying drawing shows, by way of example, a method of arranging the speed reduction gearing casing in a torpedo provided with a centrifugal pump in order to secure the general stability, of the kind set forth in my co-pending application Ser. No. 813,136, filed January 19, 1914.

Referring to the drawing, the shaft of the turbine A carries at one end a small pinion B for driving the gear C of the pump D in the opposite direction to the turbine. The water pumped from the hull through the orifices E, is delivered by the pump D to a diffusing channel H provided with vanes, thence this water passes to the generator or to the heater (not shown in the drawing) through a pipe F provided with a valve G or alternatively with a discharge valve having the desired resistance. This valve G permits of varying the output of the pump as desired, for the purpose of obtaining a moment of inertia of the wheel and of the jets of water, which will balance the sum of moments of inertia of the same value but in the opposite direction, produced by the other parts in motion in the torpedo.

The driving turbine A is preferably provided with one disk only; its angular speed being very great it is necessary to interpose speed reduction gearing I in order that the propellers may rotate at a suitable speed. The gearing is inclosed within a casing J comprising a double cover K forming a space L, within which water which has been pumped from the exterior of the torpedo circulates through the small orifices M; the water discharge takes place through the orifices N. The heating of the water by the wall of the outer casing K insures its circulation within the cover L; this circulation effectively protects the gearing against the heat of the gases which traverse the compartment P to reach the exhaust orifice. The water may be supplied to the jacket by any other means, if so desired, to protect the gearing against heating.

The casing J constitutes the oil reservoir Q; the level U of the oil in the lower part of the casing is below the gearing I, in order that the latter may not transmit thereto the heat which it acquires through friction. The oil is delivered by a pump provided with gearing T, T which draws it into the casing J through the orifices R, and distributes it to the bearings through the conduits S.

I claim:

1. In a torpedo, a gear casing adapted to completely inclose the gears therein, and a water jacket associated therewith to protect the gears against the heat of the torpedo gases.

2. The combination with the speed reduction gearing of a torpedo, of a casing completely inclosing the same, and a water jacket associated with said casing to pro- the gears are protected against the heat of the gases of the torpedo.

3. In a torpedo, a gear casing adapted to completely inclose the gears therein and adapted to contain lubricant, a pump for circulating said lubricant, and a water jacket assioicated with said casing to protect the gears and pump against the heat of the gases in the torpedo.

4. In a torpedo, a gear casing, a water jacket surrounding the same, means to admit external water to said jacket comprising a passage placing the interior of the jacket in communication with the exterior of the torpedo, and means to discharge the water from the jacket after it has circulated through the same.

In testimony whereof I affix my signature, in presence of two witnesses.

ROBERT DELAUNAY-BELLEVILLE.

Witnesses:
DENNIS C. POOLE, Jr.,
EMIL KLOTZ.